(12) United States Patent
Li et al.

(10) Patent No.: US 8,351,667 B2
(45) Date of Patent: Jan. 8, 2013

(54) METHODS OF CONTRAST ENHANCEMENT FOR IMAGES HAVING BLOOD VESSEL STRUCTURES

(75) Inventors: Wenjing Li, Honolulu, HI (US); Sankar Venkataraman, Honolulu, HI (US); Ulf Gustafsson, Honolulu, HI (US); John Taylor Hargrove, Honolulu, HI (US)

(73) Assignee: STI Medical Systems, LLC, La Jolla, CA (US)

( * ) Notice: Subject to any disclaimer, the term of this patent is extended or adjusted under 35 U.S.C. 154(b) by 943 days.

(21) Appl. No.: 12/228,739

(22) Filed: Aug. 15, 2008

(65) Prior Publication Data

US 2010/0040263 A1    Feb. 18, 2010

(51) Int. Cl.
G06K 9/18    (2006.01)

(52) U.S. Cl. ....................................................... 382/128

(58) Field of Classification Search .................... 382/128
See application file for complete search history.

(56) References Cited

U.S. PATENT DOCUMENTS

| | | | |
|---|---|---|---|
| 5,715,334 A | 2/1998 | Peters | |
| 6,032,070 A | 2/2000 | Flock et al. | |
| 6,137,899 A * | 10/2000 | Lee et al. | 382/133 |
| 6,147,705 A | 11/2000 | Krauter et al. | |
| 6,277,067 B1 | 8/2001 | Blair | |
| 6,813,373 B1 * | 11/2004 | Suri et al. | 382/128 |
| 6,858,007 B1 * | 2/2005 | Akselrod et al. | 600/437 |
| 6,879,711 B2 * | 4/2005 | Maurincomme et al. | 382/128 |
| 6,937,775 B2 * | 8/2005 | Gindele et al. | 382/254 |
| 7,024,025 B2 * | 4/2006 | Sathyanarayana | 382/128 |
| 7,116,838 B2 * | 10/2006 | Gindele et al. | 382/260 |
| 7,181,086 B2 * | 2/2007 | Gindele et al. | 382/265 |
| 7,245,781 B2 * | 7/2007 | Gallagher et al. | 382/274 |
| 7,305,111 B2 | 12/2007 | Arimura et al. | |
| 7,397,937 B2 * | 7/2008 | Schneider et al. | 382/130 |
| 7,466,851 B2 * | 12/2008 | Gulati | 382/133 |
| 7,474,775 B2 * | 1/2009 | Abramoff et al. | 382/128 |
| 7,668,351 B1 * | 2/2010 | Soliz et al. | 382/128 |
| 7,822,252 B2 * | 10/2010 | Bi et al. | 382/130 |
| 7,840,066 B1 * | 11/2010 | Chen et al. | 382/168 |
| 8,045,770 B2 * | 10/2011 | Reeves et al. | 382/128 |
| 8,090,177 B2 * | 1/2012 | Venkataraman et al. | 382/130 |
| 2004/0013292 A1 | 1/2004 | Raunig | |
| 2005/0100208 A1 | 5/2005 | Suzuki et al. | |
| 2006/0018548 A1 | 1/2006 | Chen et al. | |
| 2006/0147101 A1 | 7/2006 | Zhang et al. | |
| 2006/0184002 A1 | 8/2006 | Yarnykh et al. | |
| 2007/0002275 A1 | 1/2007 | Yan et al. | |

(Continued)

OTHER PUBLICATIONS

Li, Wenjing et al., "Automated image analysis of uterine cervical images," Proc. of SPIE, vol. 6514, pp. 65142P-1-65142P-9, 2007.

(Continued)

*Primary Examiner* — Clayton E Laballe
*Assistant Examiner* — Bret Adams
(74) *Attorney, Agent, or Firm* — Martin E. Hsia

(57) ABSTRACT

A method of contrast enhancement for improved visualization of diagnostically important tissue structures, such as blood vessels. A texture analysis algorithm is applied to identify regions with a high likelihood of disease. Mathematical morphology operations are applied to identify areas of high and low brightness (intensity). The low intensity areas are then subtracted, and controllably variable amounts of the high intensity areas are added, controlled by a selectable tuning parameter, to produce an image with controllably variable visualization enhancement.

6 Claims, 3 Drawing Sheets

U.S. PATENT DOCUMENTS

| | | |
|---|---|---|
| 2007/0165921 A1 | 7/2007 | Agam et al. |
| 2008/0002873 A1* | 1/2008 | Reeves et al. ............... 382/133 |
| 2008/0051660 A1 | 2/2008 | Kakadaris et al. |
| 2008/0081998 A1 | 4/2008 | Pan et al. |
| 2008/0137932 A1* | 6/2008 | Shen et al. ................... 382/131 |
| 2008/0226151 A1* | 9/2008 | Zouridakis et al. .......... 382/133 |
| 2008/0260217 A1* | 10/2008 | Mashiach .................... 382/128 |
| 2009/0034824 A1* | 2/2009 | Li et al. ........................ 382/133 |
| 2010/0040263 A1* | 2/2010 | Li et al. ........................ 382/128 |
| 2010/0074493 A1* | 3/2010 | Wiemker et al. ............. 382/130 |
| 2011/0103657 A1* | 5/2011 | Kang et al. ................... 382/128 |

OTHER PUBLICATIONS

Sun, Kaiqiong et al., "Enhancement of Vascular Angiogram . . . ," International Conference on Bioinformatics and Biomedical Engineering, ICBBE07, pp. 1311-1313, 2007.

Wirth, Michael et al., "Contrast enhancement of microcalcifications in mammograms . . . ," 17th IEEE Symposium on Computer-Based Medical Systems, CBMS04, 2004.

Mendiola-Santibanez, Jorge et al., "Morphological contrast measure and contrast enhancement . . . ," Signal Processing 87(9), pp. 2125-2150, 2007.

* cited by examiner

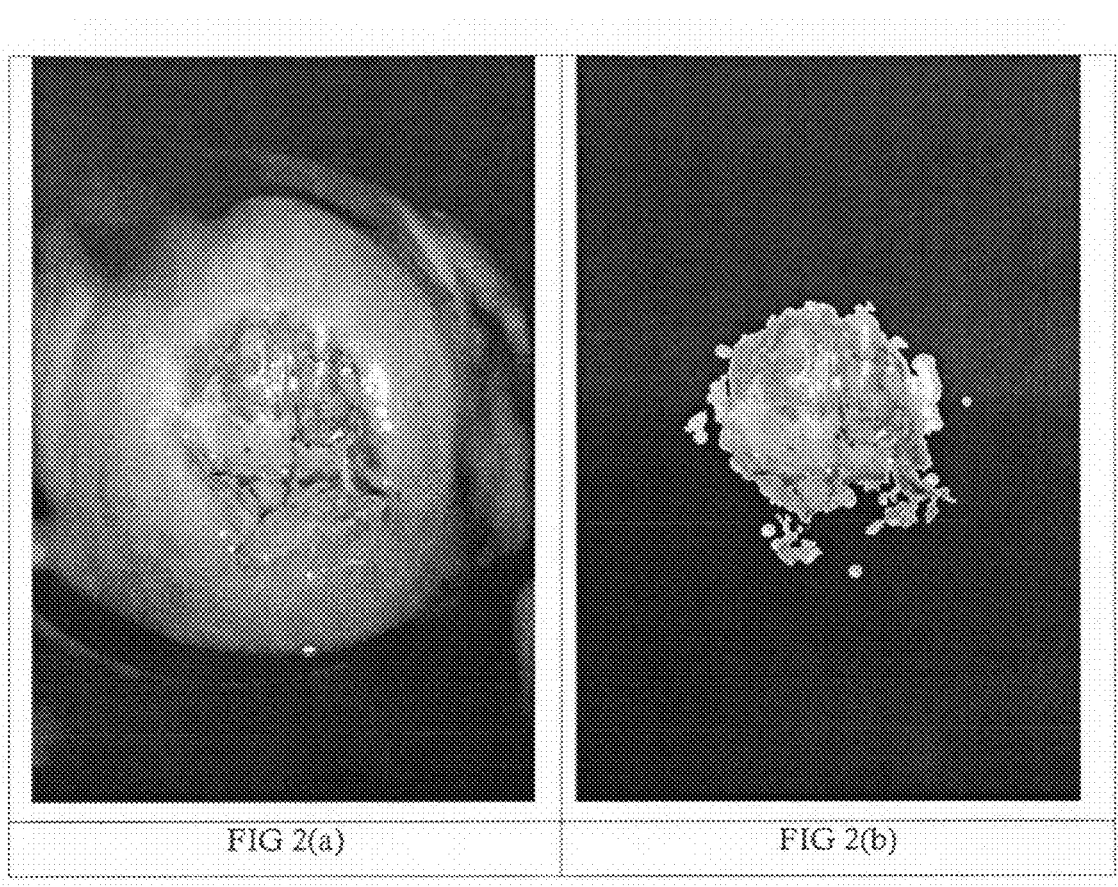

METHODS OF CONTRAST ENHANCEMENT FOR IMAGES HAVING BLOOD VESSEL STRUCTURES

TECHNICAL FIELD

This invention generally relates to medical imaging and image enhancement. This invention relates more specifically to computer aided detection and/or diagnosis of uterine cervical cancer and pre-cancerous lesions.

BACKGROUND ART

Although this invention is being disclosed in connection with cervical cancer, it is applicable to many other areas of medicine. Visual inspection is common practice in the field of medicine to detect and/or diagnose a disease. For example, a colposcopic examination involves a systematic visual evaluation of the lower genital tract (cervix, vulva, and vagina) with the purpose of identifying and ranking the severity of lesions, so that biopsies representing the highest-grade abnormality can be taken, if necessary.

At times, visualization enhancement techniques are employed in medical imaging to improve the identification of diagnostically significant tissue structures. In colposcopy, different colored filters are used to accentuate blood vessel patterns that cannot be easily seen by using regular white light. A green filter is commonly used and blocks all light except green light and allows for the increased visualization of cervical blood vessel patterns. Three different abnormal blood vessel patterns can be distinguished during a colposcopic exam: mosaic, punctation and atypical; all of which are major diagnostic features in the identification of pre-cancerous regions of the cervix (Reid, R., Herschman, B. R., Crum, C. P., Fu, Y. S., Braun, L., Shah, K. V. et al., Genital warts and cervical cancer. V. The tissue basis of colposcopic change, *Am. J. Obstet. Gynecol.* 149(3): 293-303. 1984, incorporated herein by reference; Reid, R. and Scalzi, P., Genital warts and cervical cancer. VII. An improved colposcopic index for differentiating benign papillomaviral infections from high-grade cervical intraepithelial neoplasia, *Am. J. Obstet. Gynecol.* 153(6): 611-618. 1985, incorporated herein by reference; D. G. Ferris, J. T. Cox, D. M. O'Connor, V. C. Wright, and J. Foerster, *Modern Colposcopy. Textbook and Atlas*, pp. 1-699, American Society for Colposcopy and Cervical Pathology, 2004, incorporated herein by reference).

The implementation of the green filter visual enhancement is commonly accomplished by filtering the standard white light by placing a green-colored optical filter at the output end of the light source, i.e. illuminating the cervix with green light, or by placing a green-colored filter between the cervix and the colposcope detection optics, i.e. filtering the reflected white light before being detected, either visually by the operator or electronically with an imaging sensor. These approaches have a number of drawbacks: First, the use of colored filters reduces the amount of light available and could result in a decrease in image quality. Second, colored filters add cost and mechanical complexity in that a filter assembly must be incorporated which allows for both standard white light and green filtered light during the colposcopic exam. Third, colored filters are limited to the colors of the filters.

In digital colposcopy, in which images or videos of the cervix are electronically captured using a light sensitive imaging sensor and displayed on an external monitor, other visualization enhancement techniques can be employed. The current invention applies image algorithms in the form of mathematical morphology operations in order to enhance the contrast between the cervical blood vessel patterns and the surrounding tissue, and as such provides a non-physical implementation for the increased visualization of blood vessel structures, similar to the effect of using an optical green filter.

Mathematical morphology is a technique for the analysis and processing of geometrical structures and has been used, as related to the current invention, in the automated analysis of vessels from angiograms (K. Sun and N. Sang, Enhancement of vascular angiogram by multiscale morphology, in *Bioinformatics and Biomedical Engineering*, 1311-1313 (2007), incorporated herein by reference), micro-calcification analysis from mammograms (Wirth, M., Fraschini, M., and Lyon, J., Contrast enhancement of microcalcifications in mammograms using morphological enhancement and non-flat structuring elements, Proc. $17^{th}$ IEEE Symposium on Computer-Based Medical Systems, (2008), incorporated herein by reference) and brain magnetic resonance imaging (J. D. Mendiola-Santibanez, I. R. Terol-Villalobos, G. Herrera-Ruiz, and A. Fernandez-Bouzas, Morphological contrast measure and contrast enhancement: One application to the segmentation of brain MRI, *Signal Processing* 87, (2008), incorporated herein by reference).

By implementing the visualization enhancement as an algorithm applied to an image of the cervix offers several advantages compared to the optical green filter approach. First, the algorithm approach will not reduce the amount of light and will maintain the image quality of the captured images or videos. Second, no incremental cost or mechanical complexity is added. Third, the algorithm implementation can provide the capabilities of variable visualization enhancements similar to different filter characteristics (such as color) by changing one or several algorithm parameters. Fourth, the algorithm approach can be applied to the standard white light image, providing an image display that is more pleasingly to the human eye. Fifth, image pre-processing steps can be performed to further improve the visualization enhancement. One such step would be to segment the images into different regions and apply the visualization enhancement to some of these regions only; for example, only those regions with a high likelihood of finding pre-cancerous or cancerous lesions.

Applying a visual enhancement algorithm as described in the current invention to uterine cervical images can provide the physician with increased visualization of blood vessel patterns that are sometimes difficult to detect by the naked eye. Such an algorithm could assist the physician in the identification of diagnostically important structures and provide important information in the diagnostic process.

Although many of the algorithms described in the present invention are well-known in the art, the inventors are unaware of another contrast enhancement method combining a pre-processing step to identify regions with high likelihood of disease, a mathematical morphology step to identify high and low intensity regions, and applying a tuning parameter for variable visualization enhancements, all as described later, which achieves unexpectedly better results.

The following patents and patent applications may be considered relevant to the field of the invention:

U.S. Pat. No. 6,147,705 to Krauter et al, incorporated herein by reference, discloses a video colposcope which includes a system microcomputer having algorithms for color balance levels stored into memory. A video camera obtains a subject electronic image of a subject object, and using algorithm-driven digital signal processing circuitry (DSP), color saturation, hue, and intensity levels of the subject electronic image are modified according to previously stored DSP reference filter algorithms and reference color balance levels, thus producing a modified electronic image corresponding to the subject electronic image. The modified electronic image is outputted to a display in continuous real time as the corresponding subject image is obtained by the video camera. This modified electronic image emulates that obtained through an optical green filter and incorporates a simulated white balance.

U.S. Pat. No. 6,277,067 to Blair, incorporated herein by reference, discloses a method and portable apparatus for the visual examination and grading of cervical epithelium by means of a hand-held colposcope assembly capable of producing a digital image of the cervix. This invention enables real-time imaging and archiving of the entire cervix for the purpose of detecting cancerous and pre-cancerous tissue and by virtue of computerized image processing to suggest an objective diagnosis of the cervical epithelium by means of a low cost, portable, hand-held digital colposcope.

U.S. Pat. No. 6,032,070 to Flock et al., incorporated herein by reference, discloses a system and method to view an anatomical structure such as blood vessels in high contrast with its surrounding tissue. The system and method is used to produce an image of an anatomical structure using reflected electromagnetic radiation singularly scattered from target tissue. The system and method also provide same-side illumination and detection of reflected electromagnetic radiation in a convenient integral imaging device. The system and method also provides helmet mounted imaging technology in a single integral helmet which allows the wearer to view an anatomical structure located within a patient such that the image is continuously orientated according to the orientation to the helmet wearer's head. The system and method is also used in the performance of venipuncture. The system and method provide improved contrast between any anatomical structure and its surrounding tissue for use in any imaging system.

U.S. Pat. No. 7,305,111 to Arimura et al., incorporated herein by reference, discloses a method, system, and computer program product for detecting at least one nodule in a medical image of a subject, including identifying, in the medical image, an anatomical region corresponding to at least a portion of an organ of interest; filtering the medical image to obtain a difference image; detecting, in the differenced image, a first plurality of nodule candidates within the anatomical region, calculating respective nodule feature values of the first plurality of nodule candidates from the first plurality based on pixel values of at least one of the medical images and the differenced image; removing false positive nodule candidates from the first plurality of nodule candidates based on the respective nodule feature values to obtain a second plurality of nodule candidates; and determining the at least one nodule by classifying each of the second plurality of nodule candidates as a nodule or a non-nodule based on at least one of the pixel values and the respective nodule feature value. True-positive nodules are identified using linear discriminant analysis and/or a MultiMTANN.

US Patent Application Ser. No. 2005/0100208 to Susuki et al., incorporated herein by reference, discloses a method, system, and computer program product for modifying an appearance of an anatomical structure in a medical image, e.g., rib suppression in a chest radiograph. The method includes: acquiring, using a first imaging modality, a first medical image that includes the anatomical structure; applying the first medical image to a trained image processing device to obtain a second medical image, corresponding to the first medical image in which the appearance of the anatomical structure is modified; and outputting the second medical image. Further, the image processing device is trained using plural teacher images obtained from a second imaging modality that is different from the first imaging modality. In one embodiment, the method also includes processing the first medical image to obtain plural processed images, wherein each of the plural processed images has a corresponding image resolution; applying the plural processed images to respective multi-training artificial neural networks (MTANNs) to obtain plural output images, wherein each MTANN is trained to detect the anatomical structure at one of the corresponding image resolutions; and combining the plural output images to obtain a second medical image in which the appearance of the anatomical structure is enhanced.

US Patent Application Ser. No. 2006/0018548 to Chen et al., incorporated herein by reference, discloses a method, system, and computer software product for analyzing medical images, including obtaining image data representative of a plurality of medical images of the abnormality, each medical image corresponding to an image of the abnormality acquired at a different time relative to a time of administration of a contrast medium, each medical image including a predetermined number of voxels; partitioning each medical image into at least two groups based on the obtained image data, wherein each group corresponds to a subset of the predetermined number of voxels, and each group is associated with a temporal image pattern in the plurality of medical images; selecting, from among the temporal patterns, an enhancement temporal pattern as representative of the abnormality; and determining, based on the selected temporal pattern, a medical state of the abnormality.

US Patent Application Ser. No. 2006/0147101 to Zhang et al., incorporated herein by reference, discloses a method for computer-aided detection of microcalcification clusters that obtains digital mammography data for a single view image and normalizes and filters the image data to reduce noise. A first mask is generated and applied to the image data for defining the breast structure, forming a first cropped image. A second mask is generated and applied to the image data for defining muscle structure, forming a second cropped image. An artifact mask corresponding to vascular calcifications and known imaging artifacts is generated and applied to the first and second cropped images, defining first and second artifact-masked cropped images. In a repeated sequence, portions of each artifact-masked cropped image are processed using an enhancement algorithm and reducing edge effects to obtain a set of microcalcification cluster candidates and suspected microcalcification clusters. Image processing algorithms remove false positives from the listing of microcalcification clusters and classify candidate microcalcification clusters to identify true positives.

US Patent Application Ser. No. 2006/0184002 to Yarnykh et al., incorporated herein by reference, discloses a reduced field-of-view (FOV) imaging technique that combines suppression of signals from outer volume and inflowing blood. Both outer volume and blood suppression are achieved using an SFQIR (Small-FOV Quadruple-inversion-Recovery) preparative pulse sequence including two double-inversion pulse pairs separated by appropriate delays. Within each pair, inversion pulses are successively applied to the imaged slice and the slab orthogonal to the imaging plane, with the thickness equal to the FOV size in the phase-encoding direction. Each double-inversion results in a reinversion of the magnetization in a central part of the FOV, while outer areas of the FOV and inflowing blood remain inverted. The SFQIR module was implemented for single-slice and multislice acquisition with a fast spin-echo readout sequence. Timing parameters of the sequence corresponding to the maximal suppression efficiency can be found by minimizing variation of the normalized signal over the entire range of T.sub.1 occurring in tissues.

US Patent Application Ser. No. 2007/0165921 to Agam et al., incorporated herein by reference, discloses a method for improving a thoracic diagnostic image for the detection of nodules. Non-lung regions are removed from the diagnostic image to provide a lung image. Vessels and vessel junctions of the lung(s) in the lung image are enhanced according to a first-order partial derivative of each of a plurality of voxels of the lung image. A vessel tree representation is constructed from the enhanced vessels and vessel junctions. The vessel tree representation can be subtracted from the lung image to enhance the visibility of nodules in the lung(s).

US Patent Application Ser. No. 2008/0051660 to Kakadaris et al., incorporated herein by reference, discloses a set of intravascular ultrasound (IVUS) related systems, apparatuses and methods. New catheter designs including contrast agent introduction subsystems and/or Doppler subsystems are disclosed. Methods for acquiring and analyzing Doppler data from intravascular ultrasound (IVUS) catheters are disclosed. RF-based detection of blood and/or contrast agents such as micro-bubbles are disclosed. Methods for frame-grating image data analysis permitting frame registration before, during and after a contrasting effect is imposed on a system being imaged are disclosed. Methods for difference imaging for contrast detection are disclosed. Methods for quantification and visualization of IVUS data are disclosed. And methods for IVUS imaging are disclosed.

US Patent Application Number to Shen et al., incorporated herein by reference, discloses a method and system for automatically detecting rib metastasis in a thoracic CT volume. The ribs are segmented in said CT volume by recursive tracing. A series of cross-sectional images are then generated along a centerline of each rib. Cortical and trabecular bone structures are segmented in each of the cross-sectional images for each rib. Features are calculated for each cross-sectional image based on characteristics of the cortical and trabecular bone structures, and alterations are detected in the cross-sectional images based on the features. Rib metastasis is detected in a rib when an alteration is detected in a number of consecutive cross-sectional images along the centerline of the rib.

DISCLOSURE OF INVENTION

In its most general form, the presently preferred embodiment of the present invention comprises identifying a texture region in an image having blood vessel structures; detecting high intensity areas and low intensity areas in the texture region; and controllably variably increasing contrast between the high intensity areas and the low intensity areas without introducing unacceptable unwanted noise, by using a tuning parameter to controllably variably add the high intensity areas to the texture region and subtract the low intensity areas from the texture region, so that visualization of the blood vessel patterns is controllably variably enhanced.

Thus, the invention comprises a method of image contrast enhancement for increased visualization of blood vessel structures by identifying a texture region with high likelihood of presence of disease, applying mathematical morphology operations to detect high and low intensity (brightness) areas within the texture region, and calculating a contrast enhanced image by combining the result of the texture region identification, morphological operations and a tuning parameter. The texture region is identified in the original image by determining areas within the image with high variations in intensity.

Next, areas of high and low intensity within the texture region are identified using mathematical morphology operations. Lastly, variable amounts, determined by a selectable tuning parameter, of the high intensity areas are added, and the low intensity areas are subtracted, from the texture region of the original image, producing images with controllably variable visualization enhancement of blood vessel structures.

BRIEF DESCRIPTION OF DRAWINGS

The preferred embodiments of this invention will be described, with reference to the following figures, wherein:

FIG. 2(a) shows an image of the cervix and FIG. 2(b) shows the identified texture region of the cervix.

BEST MODE FOR CARRYING OUT INVENTION

Figure 1:
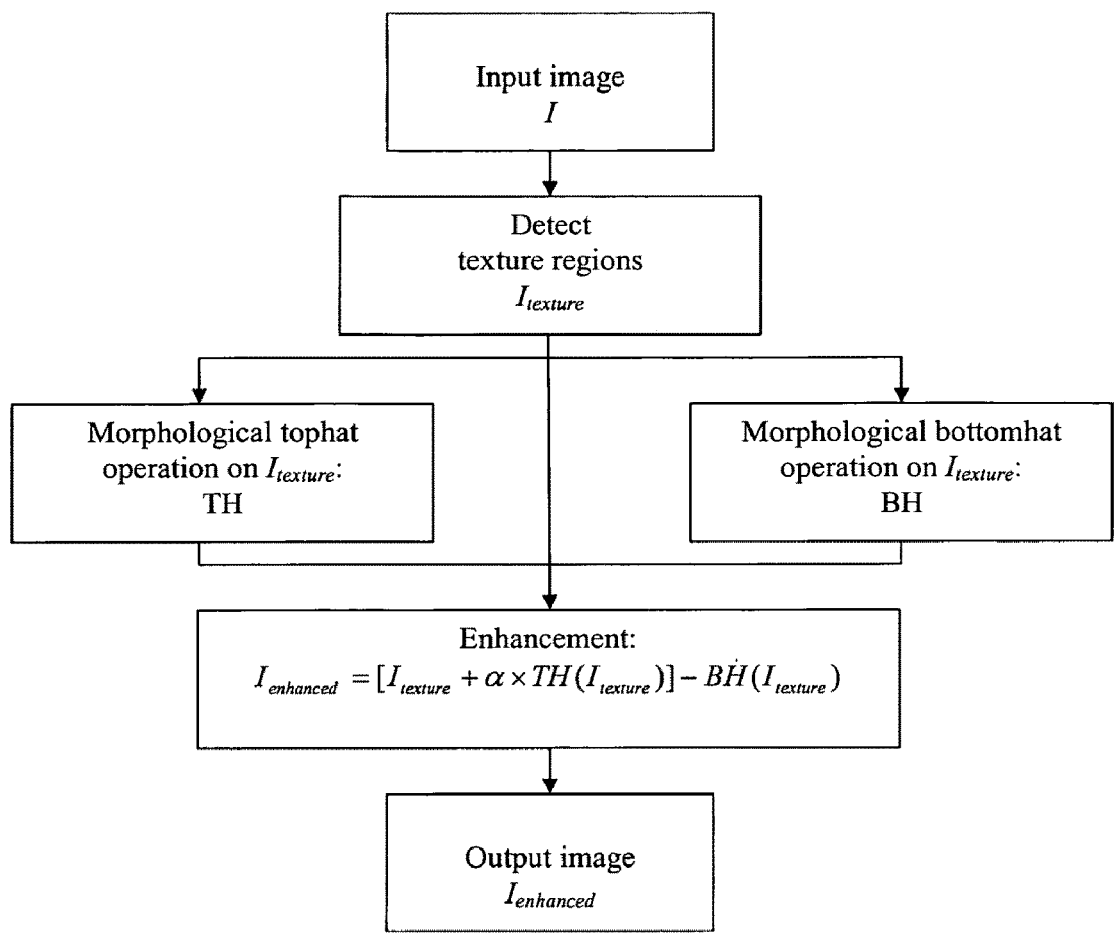
FIG. 1 shows a flowchart of the visualization enhancement method.
Figure 3A:
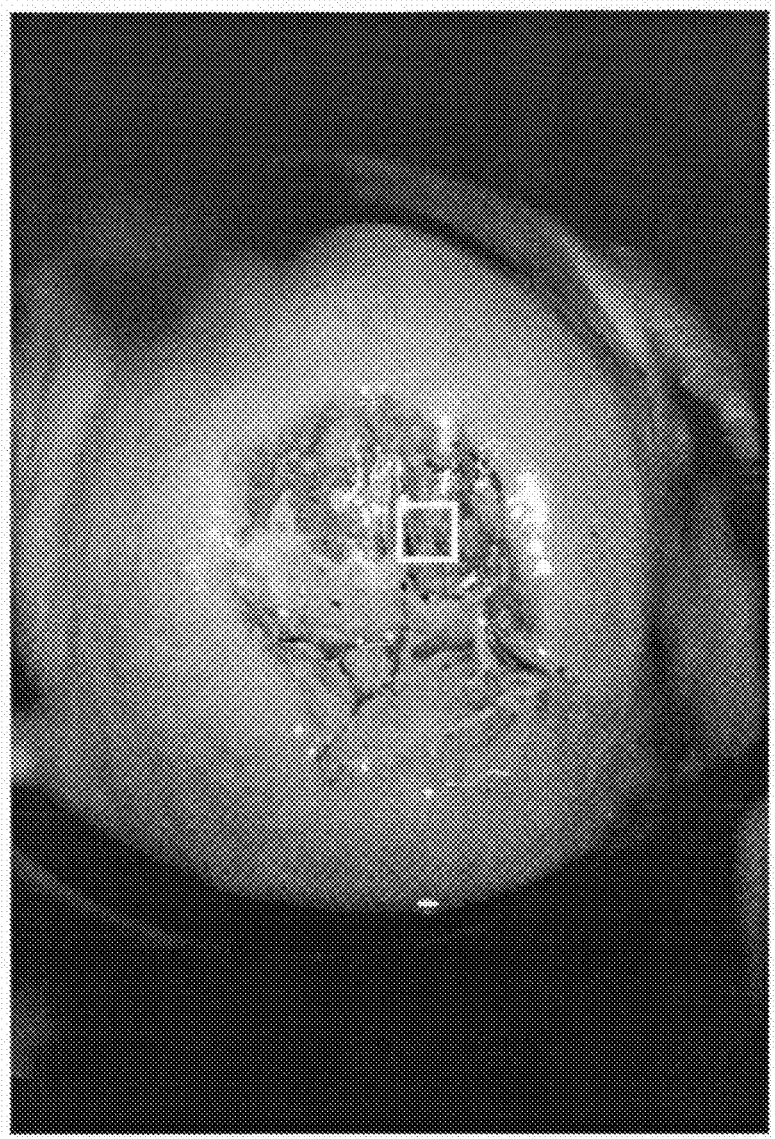
FIG. 3(a) shows the original cervical image, FIG. 3(b) displays a magnified region (indicated by a square in FIG. 3(a)) of the original image without contrast enhancement.
Figure 3B:
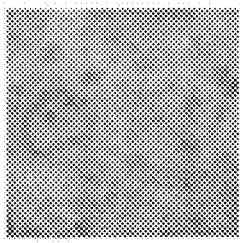
FIGS. 3(c), 3(d) and 3(e) show the result of the blood vessel structure enhancement with the tuning parameter, α, set to 0, 0.5, and 1.0, respectively.
Figure 3C:
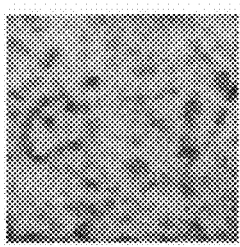
Figure 3D:
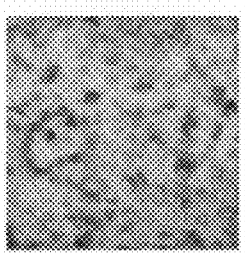
Figure 3E:
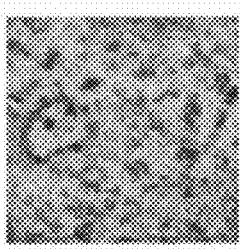

The presently preferred embodiment of the invention provides a method which increases and controllably varies the contrast between small blood vessel patterns and the surrounding tissue, without introducing artifacts (noise) in images of the uterine cervix, and as such provides a means to enhance the visualization of said blood vessel patterns. A flowchart of the presently preferred embodiment of the invention is shown in FIG. 1. The steps of the presently preferred method are described in more detail below.

1. Texture Region Identification

The visualization (contrast) enhancement method starts with an image of an organ or tissue (such as the cervix) (designated I). In the presently preferred embodiment of the current invention, a segmentation step is applied to the image in which the texture region of the cervix is identified. Texture analysis refers to the characterization of regions in an image by their texture. Texture analysis attempts to quantify rough, smooth, silky, or bumpy as a function of the spatial intensity variations in the image (the spatial extent of variations in brightness (or intensity) of the image, preferably measured by using variations in brightness in a black and white version of the image, or "grayscale"). Thus, roughness or bumpiness can be understood as the spatial extent of variations in intensity values, or gray levels, in a black and white version of the image. For the cervix, the texture region is referred to as the region which is rich in texture content or, in other words, has high variations in intensity (instead of being smooth in intensity). The cervical texture region is associated with both diseased findings, such as abnormal blood vessel structures, and normal findings, such as immature metaplasia. If cervical blood vessel patterns are not located within these fields of rich texture, pre-cancerous lesions are less likely. Thus, by detecting the texture regions, and only applying the enhancement algorithm to these areas, only blood vessel patterns associated with pre-cancerous or cancerous lesions will be visually enhanced. This invention provides the means for controllable contrast enhancement and, with segmentation, controllable local contrast enhancement.

The preferred texture region identification used in the present invention is based on the work presented by Li et al (W. Li, J. Gu, D. Ferris, and A. Poirson, Automated image analysis of uterine cervical images, *Proc. Of SPIE* 6414, 65142P1-65142P9 (2007), incorporated herein by reference) which utilizes parts of a technique presented by Forstner (Forstner, W., A framework for low level feature extraction, in *Proc. of European Conference on Computer Vision*, 383-394 (1994), incorporated herein by reference), Grading et al (Grading, J. and Lindeberg, T., Direct computation of shape cues using scale-adapted spatial derivative operators, *International Journal of Computer Vision* 17, 163-191 (1996), incorporated herein by reference), and Carson et al (C. Carson, S. Belongie, H. Greenspan, and J. Malik, Blobworld: image segmentation using expectation maximization and its application to image querying, *IEEE Transactions on Pattern Analysis and Machine Intelligence*, 24, 1026-1038 (2002), incorporated herein by reference). The texture region analysis method determines the texture contrast (i.e. intensity variations) in the image, and separates the image into areas of high and low texture. The high texture areas are clustered in one region, which defines the texture region in the cervical image. The texture region, which is a sub-part of the entire cervical image, I, is designated $I_{texture}$. FIG. 2(a) shows an image of the cervix and FIG. 2(b) shows the texture region identified using the method described above.

Although detecting the texture region is the preferred method of the current invention, it is not a pre-requisite for the following steps. The entire image of the cervix can just as well be used in the following steps.

2. Defining High Intensity and Low Intensity Regions

The step following optional detection of the texture region preferably uses operations based on mathematical morphology (J. Serra, *Image Analysis and Mathematical Morphology*, Academic Press, New York, 1982, incorporated herein by reference). Mathematical morphology is a technique for the analysis and processing of geometrical structures, such as blood vessel patterns, using a few simple mathematical concepts from set theory (which is a branch of mathematics that studies the collections of objects). The basic idea in mathematical morphology is to compare the structures in an image against a so-called structuring element having a simple predefined shape, and drawing conclusions on how this shape fits or misses the structures in the image. Commonly used structuring elements in mathematical morphology include, but are not limited to, disk shape, box shape, and diamond shape. Mathematical morphology is commonly applied to digital images, and includes edge detection, noise removal, image enhancement and image segmentation.

The preferred morphology methods used in the present invention are the top-hat and bottom-hat filters (P. Soille, A note on morphological contrast enhancement, *Technical Report Ecole des Mines d'Alès-EERIE* (1997), incorporated herein by reference; F. Meyer, Iterative image transformations for an automatic screening of cervical smears, The Journal of Histochemistry and Cytochemistry, *The Histochemical Society*, 128-135 (1979), incorporated herein by reference).

The top-hat filter captures high intensity (bright) areas in an image. Here, the top-hat filter is based on neighborhood ranking and uses the ranked value from two different sized areas. The brightest value in an area defined by a sliding window (preferably a disk shaped structuring element) is compared to the brightest value in a surrounding annular (ring-shaped) area. If the brightness difference exceeds a threshold value (typically defined as the average brightness of the surrounding area), the area is defined as a bright area. The output of the top-hat filter defines the high brightness areas in the image and is designated $TH(I_{texture})$.

After the bright areas have been identified, a bottom-hat filter can be used to capture low intensity (dark) areas, such as the blood vessel structures. Here, the size of the sliding window (preferably a disk shaped structuring element) is preferably chosen such that it slightly exceeds the diameter of the size of the vessel sought to be enhanced. The output of the bottom-hat filter defines the low intensity (darker) areas in the image and is designated $BH(I_{texture})$.

3. Contrast Enhancement

The final step in the preferred embodiment of the current invention combines the information from the previous steps in order to improve the local contrast of the image by enhancing the contrast between blood vessel structures and the surrounding tissue. One preferred method is low intensity based contrast enhancement which involves subtracting the low intensity areas from the original image and by doing so, increasing the contrast between the low intensity areas and their surroundings (K. Sun and N. Sang, Enhancement of vascular angiogram by multiscale morphology, in *Bioinformatics and Biomedical Engineering*, 1311-1313 (2007), incorporated herein by reference). Another preferred method is high intensity contrast enhancement which involves adding the output from the top-hat operation (the high intensity areas) and subtracting the bottom-hat output (the low intensity areas) from the original image. This method stretches the high intensity areas toward increased intensity whereas low intensity areas are stretched towards decreased intensity, thereby increasing the contrast of the region by a greater amount than only subtracting the low intensity areas (Wirth, M., Fraschini, M., and Lyon, J., Contrast enhancement of microcalcifications in mammograms using morphological enhancement and non-flat structuring elements, Proc. $17^{th}$ IEEE Symposium on Computer-Based Medical Systems, (2008), incorporated herein by reference; K. Sun and N. Sang, Enhancement of vascular angiogram by multiscale morphology, in *Bioinformatics and Biomedical Engineering*, 1311-1313 (2007), incorporated herein by reference).

3(a). Tuning Parameter

The presently preferred embodiment expands on the addition and subtraction approach by incorporating a controllably variable tuning parameter, α, according to the formula:

$$I_{enhanced} = I_{texture} + \alpha \times TH(I_{texture}) - BH(I_{texture}) \quad (1)$$

to create an enhanced image $I_{enhancede}$. The controllably variable tuning parameter, α, has values controllably selectable between 0 and 1, and provides a means for variable visualization (contrast) enhancement similar to different filter characteristics. From Equation (1), we can see that the tuning parameter preferably only controls the output of the top hat filter and therefore only controls contrast enhancement of the high intensity (brightness) areas, and does not control the output of the bottom hat filter (the contrast enhancement of the low intensity (brightness) areas).

A value of α=0 means that no high intensity based contrast enhancement is applied which, as described above, has the effect of only subtracting the low intensity areas from the original image and by doing so only increases the contrast of the low intensity areas from their surroundings.

A value of α=1 adds the full output from the top-hat filter and subtracts the bottom-hat output from the original image which, as described above, stretches both the high intensity areas toward increased intensity and low intensity areas towards decreased intensity, thereby applying maximum contrast enhancement.

A value of the 0<α<1 provides (in addition to variable contrast enhancement) a means of controlling the amount of unwanted noise generated in the enhanced image. Although one at first observation might think that maximum contrast enhancement (with α=1) is the standard, and desired, operating parameter, it might also increase the noise in the image to an unacceptable level, because high intensity (brightness) areas are more susceptible to noise. This would counteract the intended contrast enhancement. The reason for this behavior is a consequence of the properties (statistical variations) of light. For example, noise in detected signals increases with the intensity of the light.

A controllably variable visualization enhancement will also provide the user the opportunity to fine tune the amount of contrast enhancement to his or her personal preference.

The results of the contrast enhancement method of the current invention are illustrated in FIG. 3. FIG. 3(a) shows the original cervical image and FIG. 3(b) displays a magnified region of the original image without contrast enhancement. FIG. 3(c), FIG. 3(d), and FIG. 3(e) show the results of the contrast enhancement with the tuning parameter, α, set to 0, 0.5, and 1.0, respectively, clearly demonstrating the increased visualization of the blood vessel structure.

While the present invention has been shown and described with reference to the particular embodiments described in the detailed description and illustrated in the figures, it will be understood by one skilled in the art that various changes in detail may be effected therein without departing from the spirit and scope of the invention, as defined by the claims. Accordingly, no limitations are to be implied or inferred except as explicitly set forth in the claims.

INDUSTRIAL APPLICABILITY

This invention provides visualization enhancement and is not limited to blood vessels or the cervix. The contrast enhancement method may also be suitable for other tissue diagnosis instruments and for any other methods that require variable adjustment of contrast.

What is claimed is:

1. A method of contrast enhancement for an image having blood vessel structures, comprising:
    identifying a texture region having high spatial variations in brightness in said image;
    defining high intensity areas and low intensity areas in said texture region;
    controllably variably increasing contrast between said high intensity areas and said low intensity areas and controlling generated noise by subtracting only said low intensity areas from said texture region and using only a single user-controlled tuning parameter to controllably variably add said high intensity areas to said texture region without controlling said subtracting of said low intensity areas;
    whereby visualization of said blood vessel structures is controllably variably enhanced.

2. A method according to claim 1, wherein said defining step comprises applying a top-hat filter using only a first structuring element to define said high intensity areas in said texture region, and using a bottom-hat filter having a second structuring element to define said low intensity areas in said texture region.

3. A method according to claim 2, wherein said first structuring element is disk shaped and said second structuring element is disk shaped and has a diameter slightly exceeding the diameter of blood vessels in said blood vessel structures.

4. A method according to claim 1, wherein said identifying step is performed by segmenting said image using intensity variations in said image.

5. A method of contrast enhancement for an image having blood vessel structures, comprising:
    defining high intensity areas and low intensity areas in said image;
    controllably variably increasing contrast between said high intensity areas and said low intensity areas and controlling generated noise by subtracting only said low intensity areas from said image and using only a single user-controlled tuning parameter to controllably variably add said high intensity areas to said image, without controlling said subtracting of said low intensity areas;
    whereby visualization of said blood vessel structures is controllably variably enhanced.

6. A method according to claim 5, wherein said defining step is performed by applying a top-hat filter using only a first structuring element to define said high intensity areas, and using a bottom-hat filter having a second structuring element to define said low intensity areas.

* * * * *